3,458,861
CAS RECEIVE-ONLY CLOCK SYNCHRONIZATION
Lewis Michnik, Buffalo, N.Y., assignor to Sierra Research Corporation, a corporation of New York
Filed Mar. 6, 1968, Ser. No. 710,990
Int. Cl. G01s 3/02
U.S. Cl. 343—112                                10 Claims

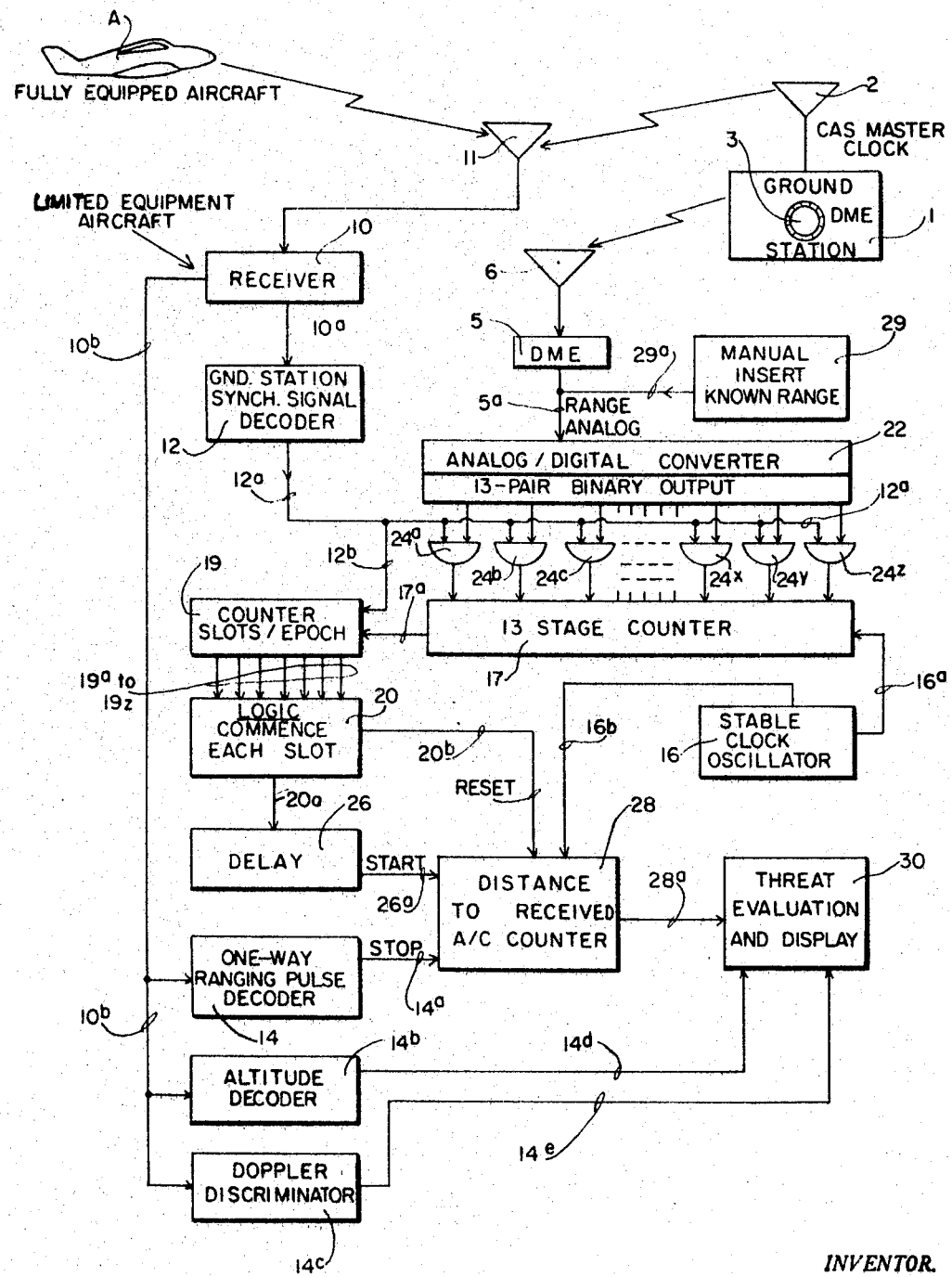

ABSTRACT OF THE DISCLOSURE

In a collision avoidance system (CAS) involving fully-equipped aircraft operating in time slots and accurately synchronized to CAS-Worldwide standardized time kept by fixed station units, the illustrative embodiment shows a system for permitting a minimally-equipped aircraft to participate to a limited extent in the CAS system by using its ordinary distance measuring equipment (DME), or some other means, to measure range to the fixed station and then inserting this range into its clock as a corrective factor thus enabling the clock to synchronize itself to the fixed station's next synchronization pulse group using the inserted range to correct for transit time of this pulse group to the aircraft. The embodiment further shows means in the minimally-equipped aircraft when synchronized for using pulse groups broadcast by other fully-equipped aircraft to evaluate threat of collision therewith.

---

This invention relates to airborne collision avoidance systems, and more particularly to means for synchronizing the clock carried by a mobile unit, such as an aircraft, with established world-time as received from a collision avoidance system station in a fixed location.

This invention will be described against the background of specifications issued by the Air Transport Association of America for a collision avoidance system designed primarily to be used by air-carrier aircraft, in which a network of fixed-position reference units, usually near airports, are all very accurately synchronized together within approximately one-half microsecond to establish a worldwide time system to which the aircraft then synchronize themselves. Each aircraft which is fully equipped to participate in the system is assigned its own time slot, and at a predetermined instant within that time slot it transmits its own ranging signal comprising a coded pulse group, as well as other signals as described in the specification by the ATA, Technical Working Group on Collision Avoidance. Other aircraft receiving that signal in the same time slot can determine the range to the transmitting aircraft by the transit time of the signal as measured by their own clock, and can also determine identity of the transmitting aircraft by the time slot in which the transmission is received. Fixed stations transmit synchronizing pulse groups in the first time slot in each repeating epoch, designated as slot 0000. The specification also provides for the possibility of the design of limited equipments which omit as many of the complexities as possible, but which retain limited capabilities which may be acceptable to some categories of users. It is to these categories of users, generally smaller aircraft, that the present invention is directed.

It is a principal object of this invention to provide a system for synchronizing the clock in the latter type of limited-equipment aircraft with CAS (collision avoidance system) signals transmitted by a fixed unit or station which is accurately synchronized to worldwide CAS time. According to the Air Transport Association specifications each complete series of time slots is called an epoch, and in the first time slot, 0000 representing the beginning of an epoch, the CAS fixed stations broadcast a pulse group which is used by the aircraft to synchronize themselves to said worldwide time. In the fully equipped aircraft, there is means for transmitting an interrogation to the fixed station and using its reply to synchronize the time clock in the aircraft. However, the present system seeks to synchronize a clock in a limited-equipment aircraft without having the aircraft transmit any interrogation to the CAS fixed station which would require a pulse reply from it, but on the contrary, to synchronize the aircraft time clock using only received signals in combination with information derived from distance measuring equipment already found in the aircraft, and assumed to be in most aircraft.

This distance measuring equipment, hereinafter referred to as DME, includes any one of several systems already in general use, such as a TACAN for military aircraft, or a VORTAC for civil aircraft. A VORTAC installation is generally located at a sizeable airport, and the present invention assumes that such a DME system will generally be available and located at the same fixed station as a CAS master clock installation, so that the range to the limited-equipment aircraft being considered herein from both installations is substantially the same.

At the beginning of an epoch when a fixed station CAS unit transmits its coded synchronizing signal, the difference in time of transmission and reception at a synchronized aircraft equipped according to the present invention is equal to the propagation time of the synchronizing signals to the aircraft and hence is proportional to the distance between the fixed station and the aircraft. The DME located at the same fixed station and cooperating with the DME in the aircraft provides an accurate indication of this range, generally within plus or minus 250 feet. While this is not an exact range, it is close enough to provide a minimally equipped aircraft with a practical degree of synchronization of its clock.

It is an object of the present invention to set the range measured by the DME into the aircraft's clock counter, and then to use the reception at the airplane of the next received synchronizing signal from the CAS fixed station to reset the clock to that range reading, and to reset the slot counter in the clock to such time within the first time slot 0000.

A system of this type has certain very substantial advantages. From the collision avoidance point of view, it permits a limited-equipment aircraft to become synchronized in such a way that it can use the ranging signals subsequently broadcast by other fully-equipped aircraft to determine the danger of collision therewith, but on the other hand it does not require special transmissions from the limited-equipment aircraft, and therefore reduces the density of signals in the vicinity of the airport.

It is a corollary advantage to employ the present system using the transmissions from CAS ground stations which are co-located with DME stations to synchronize airborne clocks for the purpose of other more general one-way ranging applications such as stationkeeping, navigation (including trilateration), telemetry, secure communication, etc. These transmissions can also be used by ground vehicles and/or ships, or by fixed monitor stations utilizing DME inputs. Even if the CAS stations are not co-located with DME stations, manual corrections for known distance differentials of the DME from the CAS station can be employed for clock setting. This approach permits one-way range estimation by any monitor station using CAS transmissions. The self-same synchronization techniques described in the ensuing disclosure will be suitable for the above purposes. The technique permits an even simpler mode of synchronization using previously worked-out information as to range of an aircraft from a CAS station whenever the aircraft is passing over one of a number of landmarks which can be easily identified by a pilot, who can dial a number representing that known range directly into his own clock counter, and thereby cause the counter to be manually adjusted, and automatically reset to the dialed range upon receipt of the next CAS synchronizing signal from the fixed CAS station.

From the military point of view, an advantage of the present system and especially the manual mode thereof is that various aircraft can be synchronized without having any of them broadcast signals to the fixed station, and thereby give away to an enemy their present location, for instance under combat conditions. Also size, weight and cost are significant factors in many airborne applications, and the invention provides savings in each of these areas.

Other means of determining range to the CAS station, such as Loran, Loran C, and Omega can be used in lieu of the DME illustrated in the present disclosure, and these systems are intended also to be included within the scope of the present invention. Other objects and advantages of the present invention will become apparent during the following discussion of a practical embodiment of the invention:

The drawing shows a block diagram representing an illustrative embodiment according to the present invention.

Referring now to the drawing, in the upper right-hand corner there is illustrated a fixed unit 1, such as an airport station, including at the same location a CAS system of the type set forth in the Air Transport Association specification and including a master clock dividing time into a predetermined number of time slots and delivering clock synchronization pulse groups via an antenna 2 at a known moment in time slot 0000. The fixed unit 1 also includes a standard DME 3, for instance a TACAN or a VORTAC system of well-known and standard type, which actually provides both bearing and range information. Current DME equipment of this type furnishes range to an aircraft with an accuracy in the order of 250 feet and at data rates of 15 per second.

In the limited-equipment aircraft, it is assumed that a DME receiver 5 is already installed and attached to a suitable DME antenna 6, and that this DME receiver 5 delivers on the wire 5a a signal, usually analog, representing range to the ground DME equipment 3, all according to known prior art techniques.

In order to have this limited-equipment aircraft unit participate in the CAS system to the extent of being warned of the presence of a fully equipped CAS aircraft A, the following additional equipment will be included as shown in the block diagram. This limited CAS equipment in the aircraft will include a CAS pulse receiver 10 connected to a suitable omni-receiving antenna 11, which may if desired be combined with the antenna 6 in a practical installation. The receiver 10 will deliver output signals into two different pulse group decoders. The decoder 12 will be sensitive to the synchronizing pulse groups transmitted at a certain instant in time slot 0000 by the fixed CAS station unit marking the beginning of a new epoch, whereby the output signal appearing on wire 12a will represent the moment of commencement of a new epoch as determined by worldwide CAS time to which the fixed CAS station is assumed to be synchronized within one-half microsecond, according to the ATA specification. The other pulse group decoder 14 is sensitive to range signals and to other signals broadcast by fully equipped aircraft A at a definite moment in its own assigned time slot, these signals being used by other aircraft to determine the range from themselves to the transmitting aircraft, said other signals including altitude, closing rate, etc. The range pulse group is uniquely encoded and will be decoded by the decoder 14 to deliver an output on wire 14a each time a ranging signal is received from a fully equipped aircraft. It is assumed that the receiver 10 and decoder 14 may be equipped with suitable safeguards against the arrival of signals from aircraft which are beyond the maximum range represented by the useful length of a normal time slot. These safeguards are well-known in the prior art and will not be discussed further herein. Other optional equipment may include altitude decoder means 14b and Doppler range-rate discriminator means 14c to help evaluate threat of collision.

The limited-equipment aircraft will include a clock and counter chain system including a relatively stable oscillator 16, such as a good crystal oscillator delivering output pulses on wires 16a and 16b. The output on wire 16a drives a binary counter chain 17, for instance of the type having thirteen flipflops dividing the 4 mHz. oscillator pulses 16 down to provide a slot-time of, for instance 1500 microseconds. This division provides an output on lead 17a to a counter 19 which counts up a certain number of time slots for example 2000, comprising a complete epoch. Signals from these counters on a bundle of wires 19a through 19z are routed to a logic network 20 which derives a signal at the start of each slot, all by means well known. Thus, the output of the logic 20 on wire 20a represents the beginning of each new time slot.

The decoded signal at 12a occurs at a time that is delayed from zero time by the time it takes for the signal to propagate from the fixed CAS station 1 to the aircraft. For example, if the aircraft were at a range of 100 nautical miles, the delay would be approximately 620 microseconds. If the counter were started upon receipt of this signal, it would be 2480 counts late because the 4 mHz. oscillator generates four counts per microseconds. However, this same range is measured by the DME 5 at the time when the decoder 12 is decoding the synchronizing signal from the ground station. In view of the fact that this range is known within the aircraft and appears on the wire 5a as an analog signal, the clock synchronization can be made accurate by setting the proper count into the thirteen stage counter 17. The analog range appearing on wire 5a from the ordinary DME is usually in analog form and therefore must be converted to a digital series of output signals. This is accomplished in an analog-to-digital converter 22 having thirteen output pairs of wires connected through 26 gating means 24a, 24b, 24c, . . . 24x, 24y, and 24z, these being simple "AND" gates all having one input connected to the wire 12a so that when the wire 12a is energized the gates 24 will set the digital count appearing on the 26 output wires from the analog-to-digital converter 22 into the thirteen stage coutner 17. If the DME is digital, it is necessary to transform that digital number into a digital number with the proper scale factor. The digital number will be, in this example, the range converted to microseconds, times four. Thus, in the previously hypothesized example of an aircraft at approximately 100 nm. (equivalent to a 620 microsecond propagation delay), the output of the analog-to-digital converter 22 would be 2480. This number is then inserted into the counter 17 by said gate means.

Moreover, the synchronizing signal from the fixed station always appears on the wire 12a only within the first slot 0000 in an epoch, and therefore the slot/epoch counter 19 can be reset by a signal group appearing on the wire 12b so that its slot count will commence with the beginning of each epoch, and will correspond with the first time slot appearing in the aircraft according to its own counting chain. Thus, not only is fine sychronization accomplished, but also coarse synchronization is accomplished to the extent of resetting the time slot counter 19 at the beginning of an epoch.

Assuming that the time clock in the limited-equipment aircraft is now synchronized, when it subsequently receives a ranging signal from a fully equipped aircraft A by way of its receiver 10 and the wire 10b, the local one-way ranging pulse decoder 14 will deliver an output signal on the wire 14a. Howver, as stated above, there is also a signal appearing on wire 20a marking the beginning of each new time slot. A delay circuit 26 is employed to provide on wire 26a an output representing the moment after commencement of a time slot at which a remote aircraft would be known to have transmitted its signal within its own time slot. This moment is generally somewhat later than the beginning of the time slot, to leave a guard space thereat. Therefore, on the wire 26a there is a signal indicating the moment when a fully equipped aircraft A, if one is within range, will have transmitted its own ranging pulse group; and on the wire 14a there subsequently appears a signal indicating the moment when this ranging pulse group was received at the limited-equipment aircraft. Thus, a time measuring device 28, such as a coutner driven by the stable clock oscillator 16 through the wire 16b counts the elapsed time between transmission and reception of the range pulse from aircraft A, and delivers a suitable signal on wire 28a indicating the range, for instance in feet, between the two aircraft. This range can then be combined with other information, such as closing rate from a decoded Doppler signal on wire 14e and telemetered altitude on wire 14d to evaluate incipient threats. Threats are evaluated and maneuvers can be commanded by block 30, which forms no part of the present invention, but is merely included to show the utility of setting the clock and counter system in an aircraft equipped with a printed CAS system using the present technique. It is assumed that the block 30 may also include warning means and means for evaluating the danger of collision, and may further include means for decoding the altitude, and closing velocity of aircraft A, which is transmitted by the latter according to another requirement of the Air Transport Association specification. By decoding the altitude of the aircraft A, it is then possible to compare this altitude with the altitude of the local aircraft as a further threat-of-collision evaluation. By decoding closing velocity of aircraft A, additional threat evaluation can be made. Returning to the blocks 14, 26 and 28, whether or not another aircraft occupies the present time slot, the signal on wire 26a will start the block 28 counting. If that time slot is unoccupied by another aircraft within range, the count will merely continue until the counter 28 is reset by an output on wire 20b prior to commencement of the next time slot. The "range" counted by the block 28 will be so great as not to initiate any response by the evaluation block 30.

As pointed out above in the objects of the present invention it may be desirable to include means for manually inserting a range into the analog-to-digital converter 22 where the actual range to the fixed CAS station is known, for instance by an aircraft flying over the Washington Monument whose range to Dulles Airport has been worked out in advance. The pilot in such an aircraft could then actuate a manual range insert means 29, which would deliver an analog range signal on wire 29a to the converter 22. Once an analog signal has been delivered to the converter 22, regardless of where the range data for determining this signal was obtained, the system can then go on and synchronize itself to a CAS station the next time the station broadcasts its synchronization signal which is then decoded in the decoder 12.

The scope of the present invention is not to be limited to the exact embodiments shown in the drawing, for obviously changes can be made therein within the scope of the following claims.

I claim:

1. In an aircraft collision-avoidance and navigation system including at least one fixed-position unit having a master clock keeping a standardized time and having means for periodically transmitting a signal marking initiation of its repeating time-clock sequence and the fixed unit further having DME means cooperative with DME means in mobile units for determining distances between fixed and mobile units, means in a local mobile unit for synchronizing itself to said standardized time, comprising:

(a) receiver means for receiving said transmitted signals;
(b) a stable clock oscillator;
(c) counter means driven by said oscillator and counting out a repeating time sequence similar to the sequence of said fixed unit;
(d) converter means connected to the local DME and operative to convert distance information therefrom into digital outputs representing the propagation time of said transmitted signals expressed in the same time-base scale factor as employed in said counter means; and
(e) means connected to said converter means and responsive to the receipt of said transmitted signals to set said outputs into the local counter means following initiation of its time sequence to reset its count to a corrected count corresponding with the propagation time of said signals from the fixed unit to the receiver means over the measured range.

2. A system as set forth in claim 1 wherein the mobile-unit DME delivers an analog signal representing the range measured to the fixed unit, and wherein said counter means comprises a multiple-stage binary counter, and wherein said converter means comprises an analog to binary digital converter having outputs respectively connected to reset each corresponding one of said multiple stages of the counter means.

3. In a system as set forth in claim 2, said reset means comprising multiple gates operative to selectively connect said converter outputs to said counter stages, the gates being normally blocked and each having an enabling input coupled to be actuated by the appearance of said transmitted signals at said receiver means.

4. In a system as set forth in claim 1, wherein the time-clock sequence generated by the fixed unit is divided into plural time slots including a time slot for propagating its own transmitted signal and including other time slots assigned to other mobile units to transmit their own position-marking signals at a predetermined moment therein, the counter means in the local-mobile unit including a slot counter to count out corresponding time slots and further including logic and delay means for determining corresponding predetermined moments in each of said time slots, means in the local mobile unit for receiving position-marking signals during the time slots assigned to other mobile units, and means for evaluating the threat of collision with other units based on the elapsed time between a predetermined moment in a time slot and the arrival of a position-marking signal in the same slot.

5. In a system as set forth in claim 4, decoder means connected to the receiver means in the local mobile unit for identifying the fixed unit's transmitted signal and connected to actuate said means to set the outputs of the converter means into the counter means and to reset the slot counter to correspond with the slot occupied by the fixed unit.

6. In a system as set forth in claim 4, decoder means connected to the receiver means in the local mobile unit for identifying position-marking signals of said other mobile units, and elapsed-time counter means driven by said clock oscillator, the elapsed time counter-means being connected to be started by an output from said delay means and stopped by an output from said position-marker signal decoder means.

7. In an aircraft collision-avoidance and navigation system including at least one fixed-position unit having a master clock keeping a standardized time and having means for periodically transmitting a signal marking initiation of its repeating time-clock sequence, and the fixed unit having a known geographical distance from at least one other landmark location to which a mobile unit can go, means in a local mobile unit for synchronizing itself to said standardized time when the mobile unit is at said location, comprising:

(a) receiver means for receiving said transmitted signals;
(b) a stable clock oscillator;
(c) counter means driven by said oscillator and counting out a repeating time sequence similar to the sequence of said fixed unit;
(d) means for inserting in the unit an indication of said geographical distance, and including converter means operative to convert said distance into digital outputs representing the propagation time of said transmitted signals expressed in the same time-base scale factor as employed in said counter means; and
(e) means connected to said converter means and responsive to the receipt of said transmitted signals to set said outputs into the local counter means following initiation of the latter's time sequence to reset its count to a corrected count corresponding with the propagation time of said signals from the fixed unit to said landmark location.

8. In a system as set forth in claim 7, said means for inserting comprising manual insertion means.

9. In a system as set forth in claim 7, said means for inserting comprising means for delivering to said converter means an analog voltage whose level represents said known distance.

10. In a system as set forth in claim 7, wherein the time-clock sequence generated by the fixed unit is divided into plural time slots including a time slot for propagating its own transmitted signals and including other time slots assigned to other mobile units to transmit their own position-marking signals during the time slots assigned to other the counter means in the local-mobile unit including a slot counter to count out corresponding time slots and further including logic and delay means for determining corresponding predetermined moments in each of said time slots, means in the local mobile unit for receiving position-marking signals during the time slots assigned to other mobile units, and means for evaluating the threat of collision with other units based on the elapsed time between a predetermined moment in a time slot and the arrival of a position-marking signal in the same slot.

References Cited

UNITED STATES PATENTS

| | | | |
|---|---|---|---|
| 3,250,896 | 5/1966 | Perkinson et al. | 343—112.4 |
| 3,167,772 | 1/1965 | Bagnall et al. | 343—112.4 |
| 3,336,591 | 8/1967 | Michnik et al. | 343—7.5 X |

RODNEY D. BENNETT, JR., Primary Examiner

CHARLES L. WHITMAN, Assistant Examiner

U.S. Cl. X.R.

343—7.5